United States Patent
Morris et al.

(10) Patent No.: US 8,132,196 B2
(45) Date of Patent: *Mar. 6, 2012

(54) CONTROLLER BASED SHOCK DETECTION FOR STORAGE SYSTEMS

(75) Inventors: Charles Powell Morris, Longmont, CO (US); Paul Andrew Ashmore, Longmont, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 339 days.

This patent is subject to a terminal disclaimer.

(21) Appl. No.: 12/489,643

(22) Filed: Jun. 23, 2009

(65) Prior Publication Data
US 2010/0322053 A1 Dec. 23, 2010

(51) Int. Cl.
*G11B 17/03* (2006.01)
(52) U.S. Cl. ....................................................... 720/632
(58) Field of Classification Search .................. 369/180; 720/632
See application file for complete search history.

(56) References Cited

U.S. PATENT DOCUMENTS

| | | | |
|---|---|---|---|
| 6,115,200 A | 9/2000 | Allen et al. | |
| 6,429,990 B2 | 8/2002 | Serrano et al. | |
| 6,469,639 B2 * | 10/2002 | Tanenhaus et al. | 340/870.16 |
| 7,400,468 B2 | 7/2008 | Kang et al. | |
| 7,434,097 B2 | 10/2008 | Guha et al. | |
| 2002/0011937 A1 * | 1/2002 | Tanenhaus et al. | 340/870.05 |
| 2004/0260967 A1 | 12/2004 | Guha et al. | |
| 2006/0212755 A1 | 9/2006 | Urmanov et al. | |
| 2010/0195243 A1 * | 8/2010 | Zhu et al. | 360/73.03 |

* cited by examiner

*Primary Examiner* — Allen Cao
(74) *Attorney, Agent, or Firm* — Thomas J. Lavan

(57) ABSTRACT

A data storage system controller having a shock detection sensor and methods utilizing such a controller are provided. The data storage system controller receives information or signals regarding shock events from the associated shock sensor, enabling the data storage system controller to take remedial action. The particular remedial action taken may be dependent on the severity of the detected shock event. The data storage system controller may also receive information regarding shock events from shock sensors provided separately from the data storage system controller, allowing the data storage system controller to take remedial action that is tailored to the locale of a shock event.

20 Claims, 4 Drawing Sheets

CONTROLLER BASED SHOCK DETECTION FOR STORAGE SYSTEMS

CROSS REFERENCE TO RELATED APPLICATIONS

The present application is related to U.S. patent application Ser. No. 12/489,655, filed Jun. 23, 2009, entitled "METHOD AND APPARATUS UTILIZING SHOCK SENSORS ON STORAGE DEVICES", the entire disclosure of which is hereby incorporated by reference herein in its entirety.

FIELD

A data storage system controller that incorporates a shock sensor and a method for providing and using such a controller is provided. In particular, methods and apparatuses related to a controller with a shock sensor that can alter an operation related to a storage device in response to detecting a shock and/or a vibration event of at least a first predetermined characteristic are provided.

BACKGROUND

The need to store digital files, documents, pictures, images and other data continues to increase rapidly. In connection with the electronic storage of data, various systems have been devised for the rapid and secure storage of large amounts of data. Such systems may include a number of storage devices that are used in a coordinated fashion. For example, data may be stored on one or more hard disk drives. However, the operation of hard disk drives is compromised in the presence of shock and vibration.

Hard disk drives typically include shock and vibration sensors. These shock and vibration sensors can cause the associated disk drive to inhibit and retard read and write operations to prevent errors in the presence of shock and vibration events. During a long shock or vibration event, the disk drive will eventually time out, issuing an error status to the host system or an associated controller. In a typical system, while a write operation is being inhibited by a disk drive, the host or controller will nonetheless continue to send data to the disk drive. This can result in overloading buffer memory provided as part of the disk drive, triggering an error event, which in turn causes further delay in storing the data.

Accordingly, it would be desirable to provide information regarding shock and vibration events to a host and/or controller, in order to allow the host and/or controller to take remedial action in response to such an event.

SUMMARY

In accordance with embodiments of the present invention, a data storage system controller having a shock and/or vibration sensor (hereinafter "shock sensor") provided as part of the controller is disclosed. The controller therefore has access to information regarding shock and vibration events directly. As a result, the controller is able to take appropriate remedial action, improving the performance and fault tolerance of the associated data storage system.

In accordance with embodiments of the present invention, the remedial action taken by the controller can include diverting the flow of data to a storage device that may be unaffected, or less affected, by the detected shock or vibration event. Alternatively, the controller can act to slow the rate at which data is provided to the storage device. Where data is diverted to an alternate storage device, the alternate storage device may be in the form of solid state memory. Alternatively, data may be diverted to a disk drive or other storage device that is in a location that is less affected or unaffected by the detected shock or vibration event.

In accordance with embodiments of the present invention, the shock sensor may be provided as one or more sensor devices mounted to the main circuit board of the controller. In accordance with other embodiments, the shock sensor may be provided on a board associated with the controller, but separate from a storage device. In accordance with still other embodiments, the shock sensor may be associated with an enclosure that also includes the controller. The enclosure may also include one or more storage devices.

Additional features and advantages of embodiments of the present invention will become more readily apparent from the following description, particularly when taken together with the accompanying drawings.

DETAILED DESCRIPTION

Figure 1:
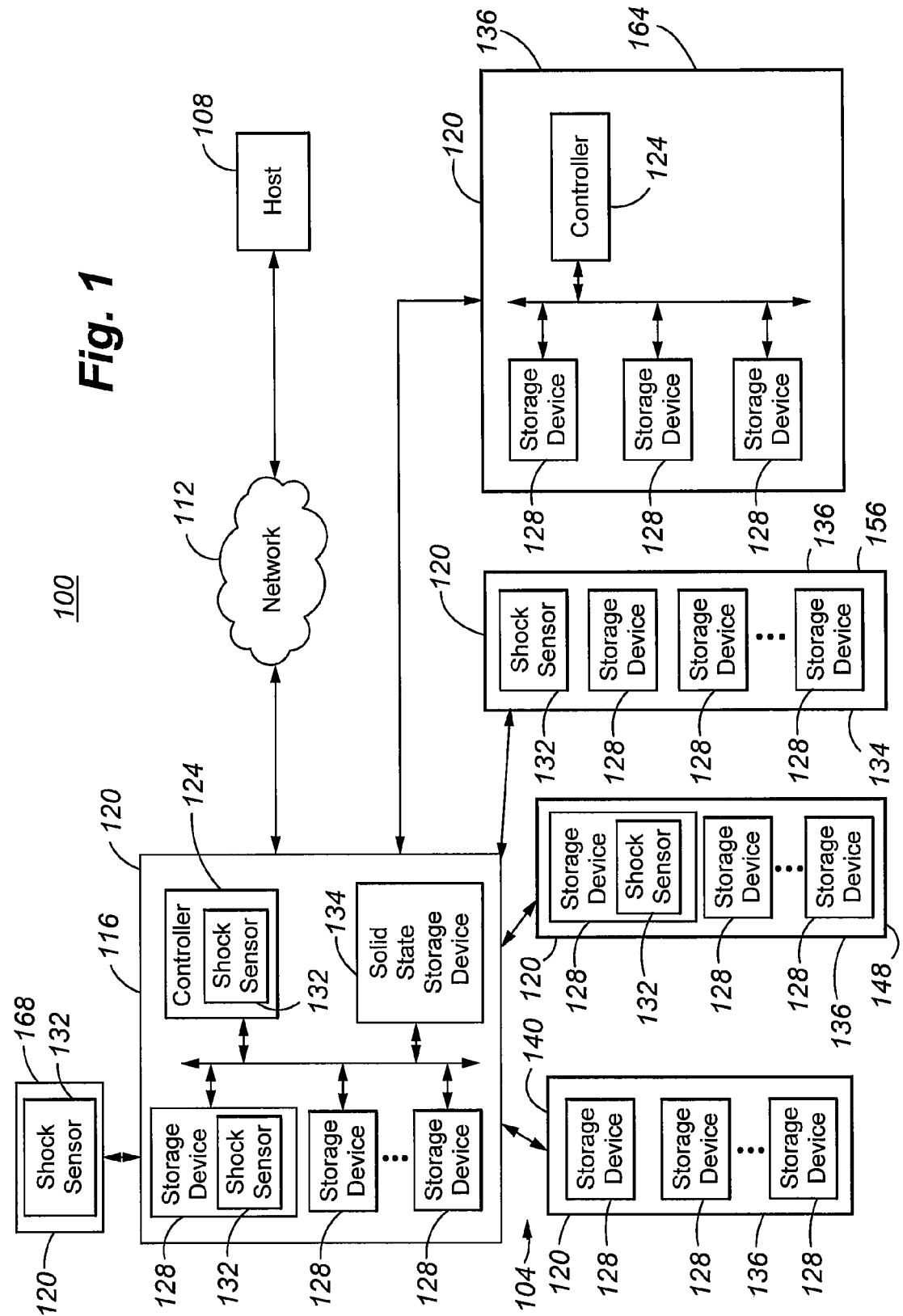
FIG. 1 is a block diagram depicting components of an electronic data system incorporating a controller with an associated shock sensor in accordance with embodiments of the present invention.

FIG. 1 is a block diagram depicting an electronic data system 100 incorporating a data storage assembly 104 in accordance with embodiments of the present invention. In general, in addition to the data storage assembly 104, the electronic data system 100 can include a host 108, such as a host computer, that is in communication with the data storage assembly 104, either directly or via a network 112. The data storage assembly 104 generally includes a data storage system 116 comprising an enclosure or support structure 120, a data storage system controller 124, and one or more data storage devices 128. In accordance with embodiments of the present invention, the data storage system controller 124 includes a shock and vibration sensor 132 (hereinafter "shock sensor"). In addition, the data storage system 116 may include a solid state storage device or secondary data storage device 134, for example to support input/output (I/O) operations during shock or vibration events. Where one or more secondary storage devices 134 are present in a system 100, the data storage devices 128 may comprise primary data storage devices. Moreover, the data storage devices may, but need not, include a shock sensor 132.

The enclosure or support structure 120 generally provides a mounting point for each of the components of the data storage system 116. As can be appreciated by one of skill in the art, in addition to components such as the controller 124 and storage devices 128, 134, the enclosure or support structure 120 may house or be connected to various other components typically provided as part of a data storage system 116, such as power supplies, cooling units and other components. Moreover, the enclosure or support structure 120 may be configured for mounting to or association with other data storage systems 116 or other enclosures or devices, for example by being stackable or rack mountable.

The data storage system controller 124 generally operates to control and/or coordinate the operation of associated storage devices 128. For example, the data storage system controller 124 can control the distribution of data across a plurality of storage devices 128, for instance in connection with the implementation of a RAID (redundant array of independent (or inexpensive) disks) system. In addition, the data storage system controller 124 may support error checking and parity data functions.

The shock sensor 132 generally comprises an accelerometer and associated circuitry. The shock sensor may thus be provided by various devices, including piezo-electric transducers (PZTs), potentiometric, or other acceleration sensors.

If provided, a secondary data storage device 134 may be in the form of a solid state storage device or other data storage component. In general, the secondary data storage device 134 differs from the data storage devices 128 in that the secondary data storage device 134 remains operable in the presence of shock events. Accordingly, a solid state storage device, for example provided by solid state memory, can be used to provide a secondary data storage device 134. In accordance with embodiments including a secondary data storage device 134, the storage devices 128 may operate as primary data storage devices, and the secondary data storage device 134 may operate to store data on a limited or temporary basis while the primary data storage devices 128 are completely or partially inoperable or inaccessible, for example due to the occurrence of a shock event.

The data storage devices 128 may comprise, for example, hard disk drives, such as serial advanced technology attachment (SATA), small computer interface (SCSI), serial attached SCSI (SAS), Fibre Channel (FC), or parallel advanced technology attached (PATA) hard disk drives. Other examples of data storage devices 128 include magnetic tape storage devices, optical storage devices or other storage devices. As can be appreciated by one of skill in the art, hard disk drive type data storage devices, and other data storage devices that require precise alignment between movable mechanical components in order to reliably read and write data, can be adversely affected by shock and/or vibration events. Accordingly, it is often desirable to modify or suspend read and write operations in the presence of shock and/or vibration events, in order to safeguard data. Although a number of data storage devices 128 are illustrated, it should be appreciated that embodiments of the present invention are not limited to any particular number of data storage devices 128.

The data storage assembly 104 may also be associated with auxiliary or data storage sub systems 136. Where a data storage sub system 136 is included, the data storage system 116 may comprise a primary data storage system 116. An example of a data storage sub system 136 is a JBOD (Just a Bunch of Disks) system 140, which can include an enclosure or support structure 120 to which one or more data storage devices 128 are connected. As can be appreciated by one of skill in the art, the data storage devices 128 of a JBOD system 140 may operate under the control of the data storage system controller 124 of the primary data storage system 116. Another example of a data storage sub system 136 is an alternate JBOD system 148 that includes one or more data storage devices 128, with at least one of the data storage devices 128 incorporating a shock sensor 132. Yet another example of a data storage sub system 136 that may be included in a data storage assembly 104 is a further alternate JBOD system 156 that includes, in addition to one or more data storage devices 128, a shock sensor 132 mounted in or to an I/O board, enclosure or chassis 120. Still another example of a data storage sub system 136 that may be associated with a data storage assembly 104 in accordance with embodiments of the present invention is an SBOD (Switched Bunch of Disks) or RAID system 164 comprising an enclosure or chassis 144, a controller 124, and one or more storage devices 120. The SBOD or RAID system 164 may include a shock sensor 132 in any or all of the controllers 124, one or more data storage devices 128, or enclosure 120, although no shock sensor 132 is required as part of the SBOD or RAID system 164.

Data storage sub systems 136 may be connected to the data storage system 116 through a direct point-to-point connection, a bus, or a network connection, including a connection through the network 112. Although data storage sub systems 136 may be interconnected to the data storage system 116 in various ways, the data storage system 116 and any data storage sub systems 136 of a data storage assembly 104 are generally located at or near the same location. More particularly, the data storage system 116 and any associated sub data storage systems 136 may be mounted to a common storage rack or system of racks, or within a common facility. In accordance with still other embodiments of the present invention, such co-location of a data storage system 116 and sub data storage systems 136 is not required. Moreover, a data storage assembly 104 is not required to include any data storage sub systems 136.

In accordance with still other embodiments, a data storage assembly 104 may include a shock sensor 132 that is provided separately from a data storage system 116 or data storage sub system 136. For example, a shock sensor 132 may be provided in a separate mount or enclosure 120 that is co-located with the data storage sub system 116 to provide real time shock data to the data storage system controller 124. Accordingly, such an external shock sensor assembly 168, included as part of the data storage assembly 104 for the purpose of providing shock information to the controller 124, may provide an alternate to a data storage system controller 124 that incorporates a shock sensor 132. As a further example, an external shock sensor 132 may be provided in addition to a shock sensor 132 that is integral to the data storage system controller 124. An external shock sensor assembly 168 can facilitate adding a shock sensor 132 to a data storage assembly 104 that did not previously include a shock sensor 132 operable to provide shock data to the data storage system controller 124. Communication between the external shock sensor 168 and the data storage system controller 124 may be over a standard communication bus, or a dedicated signal line. In general, an external shock sensor 168, if provided, is co-located with at least some of the other components of the data storage assembly 104, and may be fixed to an enclosure 120 of another component of the data storage assembly 104.

Figure 2:
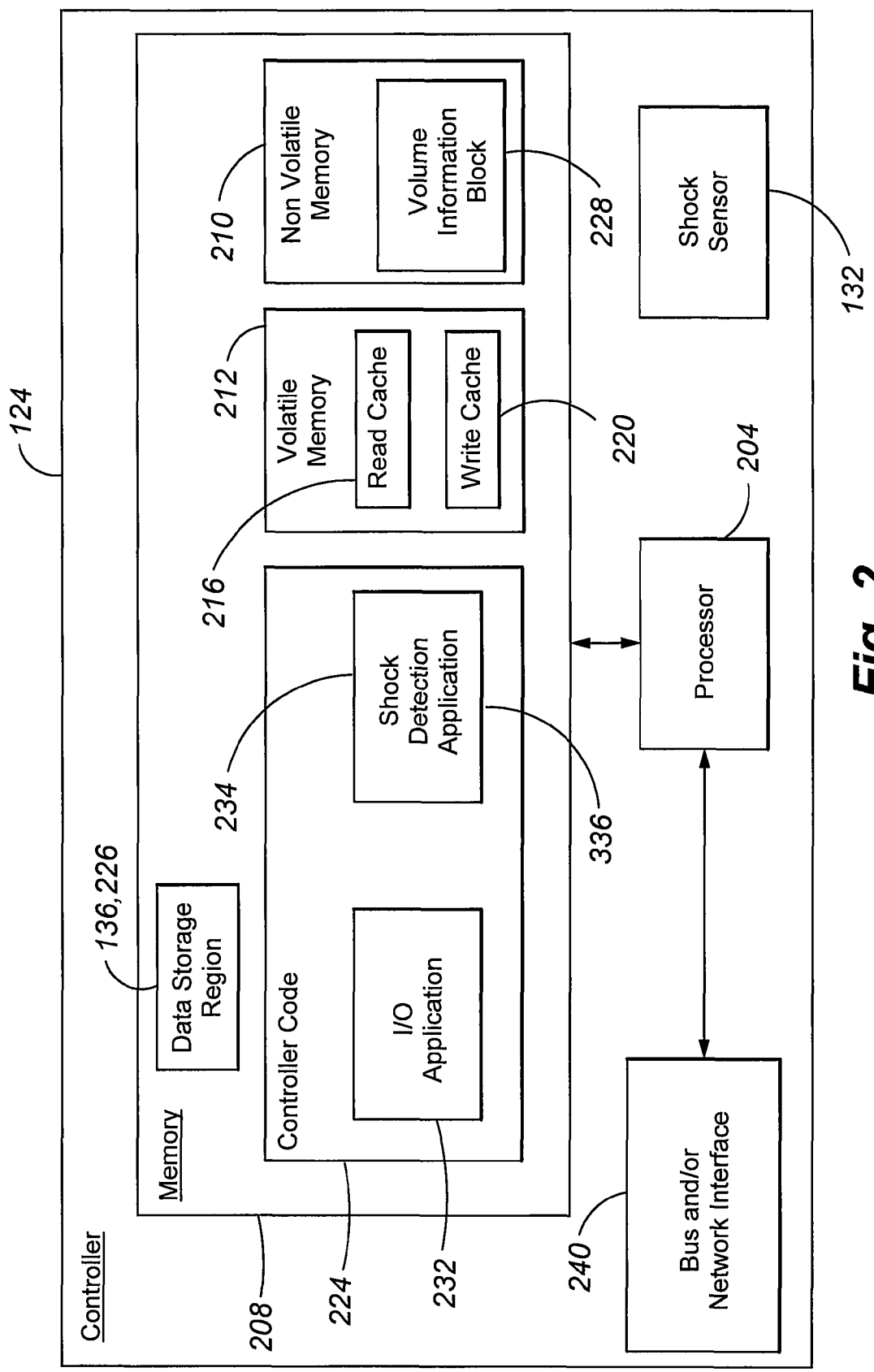
FIG. 2 is a block diagram depicting components of a controller having a shock sensor in accordance with embodiments of the present invention.

FIG. 2 illustrates aspects of a data storage system controller 124 in accordance with embodiments of the present invention. In general, a data storage system controller 124 includes a processor sub system 204 capable of executing instructions for performing, implementing and/or controlling various data storage system controller 124 functions. Such instructions may include instructions for implementing aspects of a shock detection method and apparatus in accordance with embodiments of the present invention. Furthermore, such instructions may be stored as software and/or firmware. The processor sub system 204 may be implemented as a number of discreet components, such as one or more programmable processors in combination with one or more logic circuits. Alternatively or in addition, the processor sub system 204 may include or be implemented as one or more integrated devices or processors. For example, a processor sub system 204 may comprise a complex programmable logic device (CPLD).

A data storage system controller 124 also generally includes memory 208. The memory 208 is not specifically limited to memory of any particular type. For example, the memory 208 may comprise a solid state memory device, or a number of solid state memory devices. In addition, the memory 208 may include separate non-volatile memory 210 and volatile memory 212 portions. As can be appreciated by one of skill in the art, the memory 208 may include a read cache 216 and a write cache 220 that are provided as part of the volatile memory 212 portion of the memory 208, although other arrangements are possible. Examples of volatile memory 212 include DRAM and SDRAM.

The non-volatile memory 210 may be used to store data that was written to the write cache of memory 208 in the event of a power outage affecting the data storage system 116 and/or any data storage sub systems 136. The non-volatile memory portion 210 of the data storage controller memory 208 may include any type of data memory device that is capable of retaining data without requiring power from an external source. Examples of non-volatile memory 210 include, but are not limited to, compact flash or other standardized non-volatile memory devices.

A volume information block 228 may be stored in the non-volatile memory 210 although in accordance with at least some embodiments of the present invention the volume information block 228 resides in volatile memory 212. The volume information block 228 comprises data that may be used to represent attribute data information for master volumes, backing stores, and/or snapshots. Each master volume, backing store, and snapshot is typically associated with a different volume information block 228. The volume information block 228 may be referenced prior to data access during an I/O operation.

The memory 208 also includes portions of the memory 208 comprising a region that provides storage for data storage system controller code 224. The controller code 224 may comprise a number of components or segments, including an I/O application 232 comprising instructions for accessing and manipulating data. The I/O application 232 may provide the data storage system controller 124 with the ability to perform read and/or write operations concerning data on a storage volume, for example comprising one or more storage devices 128. The I/O application 232 may reference a volume information block 228 prior to executing such operations. The I/O application 232 may also employ the read 216 and write 220 caches when performing such operations.

A shock detection application or algorithm 234 is an example of another application or set of instructions that may be included in the controller code 224. Although depicted as separate from the I/O application 232, the shock detection application 234 may be provided as part of the I/O application 232. If provided separately, or as a separate software module or a separate set of instructions, the shock detection application 234 is generally in communication with the I/O application 232, to coordinate functions in connection with operation of the data storage system controller 124. In general, the shock detection application 234 comprises a shock detection algorithm that receives input from the shock sensor 132 included as part of the data storage system controller 124. More particularly, the shock detection application 234, in response to signals received from the shock sensor 132, may determine that a shock and/or vibration event (hereinafter "shock event") that requires remedial action has occurred.

The shock detection application 234 may then cause or initiate appropriate remedial action. Moreover, the shock detection application 234 may determine a level of remedial action to be performed in response to a detected shock event. In addition, the shock detection application 234 may receive signals from a shock sensor 132 provided as part of a data storage device 128 included in the data storage system 116, from a shock sensor 132 in a data storage sub system 136 associated with the data storage system 116 in which the data storage system controller 124 is included, from a shock sensor 132 provided as part of an external shock sensor assembly 168, or from any other shock sensor 132 interconnected to the data storage systems controller such that shock and vibration signals can be provided from the shock sensor 132 to the controller 124. In accordance with further embodiments of the present invention, the shock sensor 132 may provide a raw signal to the controller 124, or the shock sensor 132 may process shock data to provide an indicator as to whether and to what degree remedial action should be taken. The shock detection application 234 may then initiate appropriate remedial action. Where the data storage system controller 124 receives signals from shock sensors 132 other than the shock sensor of the data storage system controller 124, such signals preferably (although not necessarily) comprise real time information regarding the magnitude of a shock event, as opposed to information concerning a storage device's 128 response to a shock event. That is, it is generally more useful for the data storage system controller to receive information characterizing the shock event itself. However, in accordance with further embodiments, information regarding a storage device's 128 response to a shock event can be used to control the flow of data, provided such information is delivered to the data storage system controller 124 in a sufficiently timely manner.

The memory 208, in accordance with at least some embodiments of the present invention, may also provide a data storage region 226. The data storage region 226 may provide space for data being transferred during I/O operations. Moreover, the data storage region 226 may be used at or around the time that a shock and/or vibration event (hereinafter "shock event") is detected. Accordingly, I/O operations may proceed with little or no interruption, even while primary storage devices 128 are unable to read or write data, or are disabled from reading or writing data, during a shock event. The data storage region 226 of memory 208 may be provided as a discrete chip or component, or it may be provided as a region of a chip or component that also provides space for other regions or areas of memory. In addition, the data storage region 226 may comprise volatile and/or non-volatile memory. The data storage region 226 may operate in cooperation or conjunction with a secondary storage device 134, if provided. Alternatively, the data storage region 226 may operate to itself provide a secondary data storage device 134 in the form of a solid state storage device.

A data storage system controller 124 may additionally include other components. For example, a bus and/or network interface 240 may be provided for operabley interconnecting the data storage system controller 124 to the remainder of the data storage system 116 and/or the data storage assembly 104. Such operable interconnections may support the transfer of both data and signals from shock sensors 132. In addition, for example where the bus and/or network interface 240 is not used to provide signals from shock sensors 132 that are provided apart from the data storage system controller 124, inputs for such data may be provided.

Figure 3:
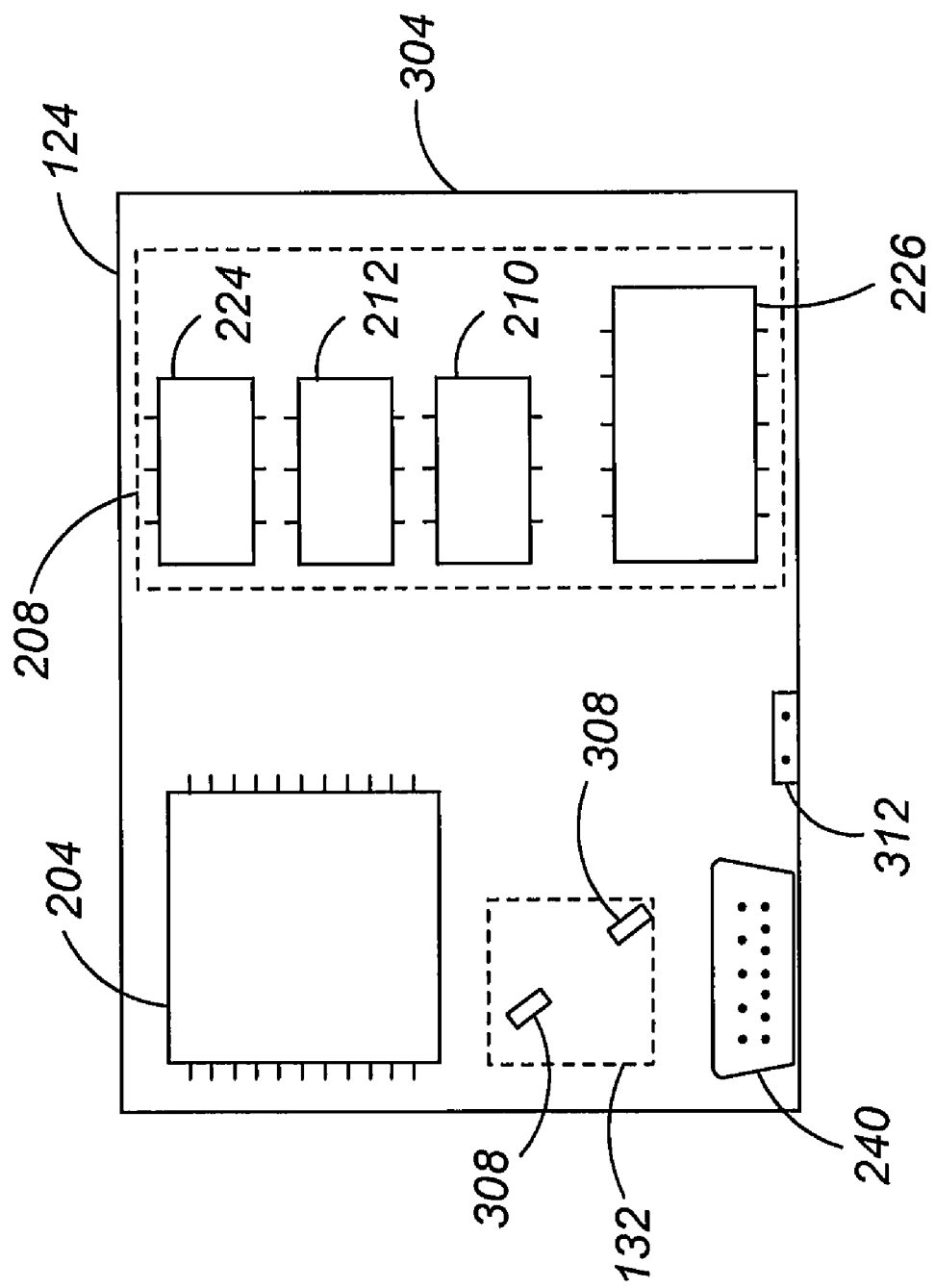
FIG. 3 is a depiction of a data storage system controller board in accordance with embodiments of the present invention.

FIG. 3 is a depiction of a data storage system controller 124, including a substrate or printed circuit board 304 through which components of the data storage system controller board 124 may be interconnected. Accordingly, as depicted, various components, such as the processor 204 and various chips or integrated circuits comprising the memory 208, such as non-volatile memory 210, volatile memory 212, volatile and/or non-volatile memory providing storage for controller code 224, and a chip or integrated circuit providing a data storage region 226, may be surface mounted or otherwise interconnected to the substrate 304. Another component that may be mounted to the substrate 304 is the shock sensor 132. As shown, the shock sensor 132 may comprise a pair of orthogonally oriented sensors 308. For example, the sensors 308 may comprise PZTs. The connectors for physically interconnecting the data storage system controller 124 to other components of the data storage system 116, such as the bus and/or network interface 240, for example a fibre channel connector, and a power supply connector 312, can also be included.

Figure 4:
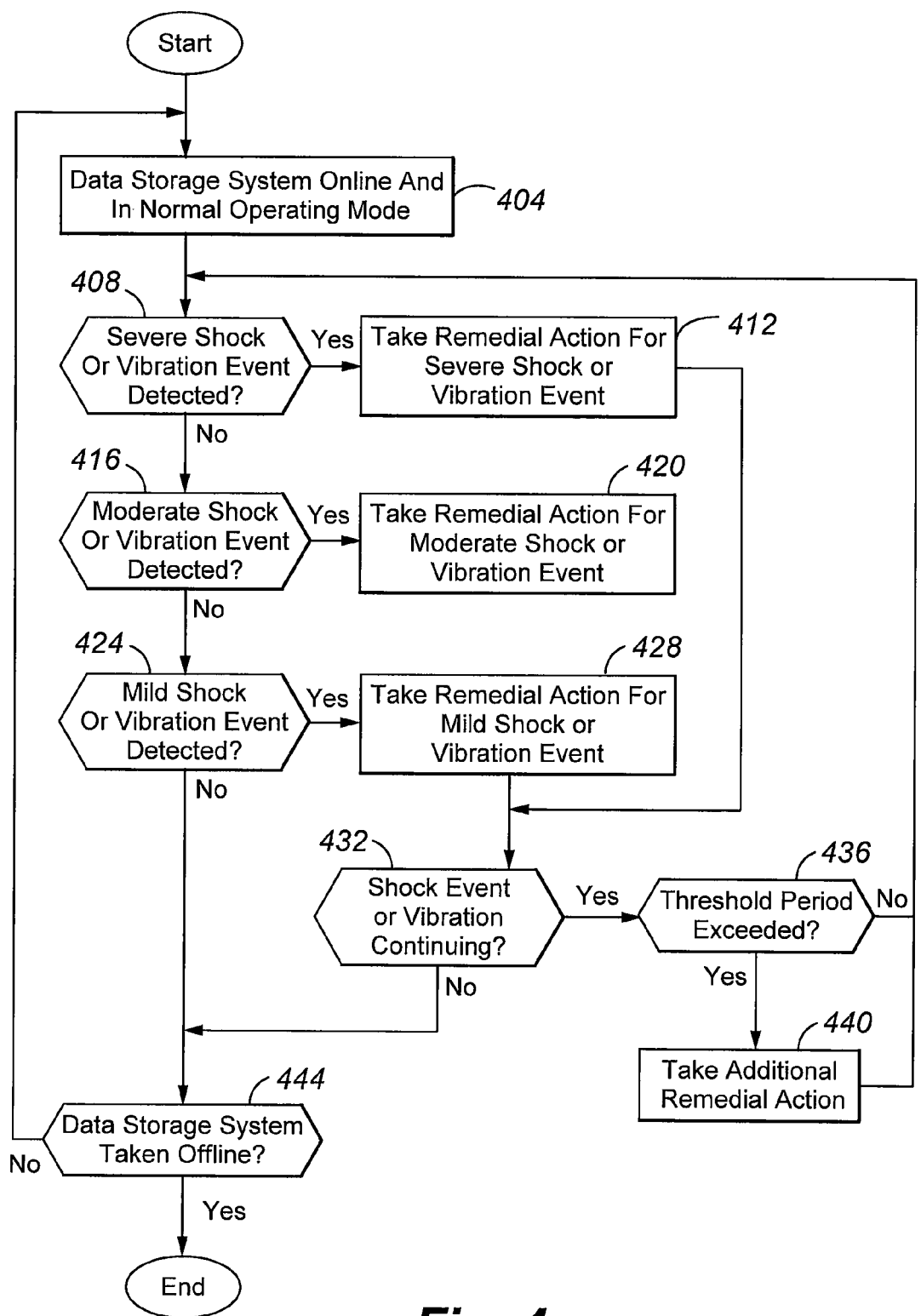
FIG. 4 is a flow chart illustrating aspects of a process for detecting and addressing shock and vibration associated with a data storage system in accordance with embodiments of the present invention.

FIG. 4 illustrates aspects of the operation of a data storage assembly 104 including a data storage system 116 in accordance with embodiments of the present invention. In particular, a process in which an alternate data storage process comprising one or more remedial actions is implemented by a data storage system 116 controller 124 in response to a shock event is depicted. After start of the process, the data storage system 116 is placed online and in normal operating mode (step 404). At step 408, a determination is made as to whether a severe shock event has been detected. If a severe shock event has been detected, remedial action for a severe shock event is taken (step 412). If a severe shock event is not detected, a determination may be made as to whether a moderate shock event has been detected (step 416). If a moderate shock event is detected, remedial action for a moderate shock event may be taken (step 420). If a moderate shock event is not detected, a determination may be made as to whether a mild shock event has been detected (step 424). If a mild shock event has been detected, remedial action for a mild shock event may be taken (step 428).

Information regarding a shock event is provided to the data storage system 116 controller 124 from the shock sensor 132 included as part of the controller 124. Alternatively or in addition, the controller 124 can receive signals regarding shock events from shock sensors 132 associated with other components of the data storage assembly 104. Where the controller 124 receives shock information from shock sensors 132 that are external to the data storage system 116, such signals may be formatted according to a standardized protocol. Alternatively or in addition, the data storage system controller 124 may be capable of interpreting signals from shock sensors 132 that are formatted according to different protocols. For example, the controller 124 may be able to understand and act on signals formatted according to protocols that are proprietary or unique to the manufacturers of devices or systems incorporating a shock sensor 132 providing shock data to the controller 124.

Remedial action in response to a shock event can include taking one or more of a variety of measures. For example, the data storage system controller 124, through execution of the shock detection application 234 running on the controller processor 204, can notify the I/O application 232 (if separate) of the shock event and/or cause the I/O application 232 functions to be altered, so that data to be written to the data storage devices 128 is instead cached in secondary data storage 134. As another example, the data storage system controller 124, again through execution of the shock detection application 234 running on the controller processor 204, can notify the host 108 to expect delays in receiving requested data. As yet another example of remedial action, the data system controller 124, through execution of the shock detection application 234, can request that the host 108 reduce the rate at which data is provided to the data storage assembly 104 for storage. In connection with remedial action that includes an alteration to the function of the data storage system controller 124 or the host 108, further signals can be sent from the data storage system controller 124 in response to a change concerning the shock event. For instance, where the shock detection application 234 has determined that remedial action is no longer required, for example in response to detecting the conclusion of a shock event, notification to other applications, processes, or the host that the shock event has concluded can be given. As a further example, where the severity of a shock event changes, the data storage system controller 124 shock detection application 234 can cause a change in the remedial action that is being taken. In accordance with still other embodiments, the remedial action that is being taken can be altered in response to a continuing shock event. For example, if data from a host system 108 is placed in a secondary data storage device 134 during a shock event, the shock detection application 234 may, in response to the secondary data storage device 134 having been filled to some fraction of its total capacity, instruct the host 108 to reduce the rate at which data is provided to the data storage assembly 104 for storage. As can be appreciated by one of skill in the art, the particular remedial action or set of remedial actions, or the degree to which a remedial action is applied, can be varied according to the severity of a shock event, the length of time over which the shock event has occurred, the status of any secondary data storage devices 134, or any other factors.

In accordance with still other embodiments of the present invention, information concerning the locale of shock events may be used by the data storage system controller 124 in connection with determining appropriate remedial action. For example, the data storage system controller 124 may be provided with signals from one or more shock sensors 132 that are provided in addition to the shock sensor 132 included in the data storage system controller 124 of the data storage system 116. These additional shock sensors 132 may be used to verify information provided by the shock sensor 132 included as part of the data storage system controller 124. Alternatively or in addition, shock sensors 132 provided separately from the data storage system controller 124 may be used to provide the data storage system controller 124 with information concerning conditions affecting the performance of data storage devices 128 associated with any data storage sub systems 136. As a result, the data storage system controller 124 can operate to handle the data associated with data storage devices 128 that are experiencing a shock event differently from data associated with data storage devices 128 that are not experiencing a shock event at a particular point in time. For example, where a shock sensor 132 associated with a data storage sub system 136 is detecting the presence of a shock event, the data storage system controller 124 may cause data being passed to that data storage sub system 136 to be stored temporarily in a secondary storage device 134 and/or in a data storage device 128 of a data storage system 116 or 136 that is not experiencing a shock event. As a further example, where a data storage system controller 124 detects a shock event associated with the data storage system 116, for example from the shock sensor 132 associated with the data storage system controller 124, data received from a host for storage in data storage devices 128 associated with the data storage system 116 may instead be diverted to secondary data storage 134 of the data storage 116 or as part of a data storage sub system 136, or to data storage devices 128 associated with a data storage sub system 136 that is not undergoing a shock event. Accordingly, remedial action in response to a shock event affecting one system enclosure 120, but not another enclosure 120, can include directing data to data storage devices 128 in the unaffected enclosure 120. Alternatively or in addition, the controller can limit or otherwise alter I/O operations with respect to data storage devices 128 in an enclosure 120 experiencing a shock event, while allowing I/O operations with respect to data storage devices 128 in an enclosure 120 that is not experiencing a shock event to continue normally.

Although certain examples of remedial action that may be taken in response to the detection of a shock event have been provided for illustration purposes, it should be appreciated that embodiments of the present invention are not necessarily limited to such examples. For instance, a secondary data storage device 134, such as a solid state data storage device, is not required. Accordingly, where a data storage system controller 124 is provided with information indicating the presence of a shock event by an associated shock sensor 132, the remedial action that is taken may comprise notification of the shock event to a host 108, so that the host may alter operation. Moreover, where the data storage system controller 124 is included in an electronic data system 100 containing or including one or more data storage sub systems 136, in addition to the data storage system 116, and where a shock sensor 132 is associated with at least some of the data storage sub systems 136, in addition to a shock sensor 132 being provided as part of the data storage system controller 124, the data storage controller 124 may divert data to a data storage assembly 104 that is not experiencing a shock event.

After taking remedial action (at any of steps 412, 420 or 428) a determination may be made as to whether the shock event is continuing (step 432). If the shock event is continuing, a determination may next be made as to whether a threshold period has been exceed (step 436). For example, if a shock event continues for an extended period of time, it may be desirable to take additional remedial action (step 440). For example, even where the shock event is mild or moderate, where the shock event has continued for an extended period it may be necessary to take additional remedial action. After determining that the threshold period has not been exceed, or after taking additional remedial action, the process may return to step 408.

If a shock event has not been detected (at any of steps 408, 416 or 424), or if it is determined after taking remedial action that the shock event is not continuing (at step 432), a determination may next be made as to whether the data storage system 116 has been taken offline (step 444). If the data storage system 116 has not been taken offline, the process may return to step 404. If the data storage system has been taken offline, the process may end.

As can be appreciated by one of skill in the art, a host 108 generally comprises a programmable processor and memory for executing program instructions. Accordingly, embodiments of the present invention can include providing shock and vibration signals from shock sensors 132 to a host 108 for processing. For instance, in connection with a system in which a host implements the functions of a controller 124, that host 108 can initiate remedial action with respect to I/O operations to and from components of the data storage assembly 104 in response to shock and vibration events.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A storage system, comprising:
   at least a first primary data storage device, wherein operation of the first primary data storage device is sensitive to shocks; and
   a controller, the controller including:
     a processor, the processor running a vibration detection algorithm; and
     a shock sensor, wherein the shock sensor generates an output in response to a shock to the controller, wherein the output of the shock sensor is provided to the vibration detection algorithm, and wherein in response to detecting a shock exhibiting at least a first predetermined characteristic, the controller alters an operation related to the first primary storage device.

2. The storage system of claim 1, wherein the shock sensor of the controller includes a piezoelectric transducer.

3. The storage system of claim 2, wherein the controller further includes an analog to digital converter, wherein an analog output from the piezoelectric transducer is converted to a digital signal by the analog to digital converter, and wherein the digital signal is then provided as an input to the processor and the vibration detection algorithm.

4. The storage system of claim 2, wherein the controller further includes a first circuit board, and wherein the piezoelectric transducer is mounted to the first circuit board.

5. The storage system of claim 4, wherein the processor is mounted to the first circuit board.

6. The storage system of claim 1, wherein the first primary data storage device includes a hard disk drive.

7. The storage system of claim 1, wherein the first primary data storage device includes an optical storage device.

8. The storage system of claim 1, further comprising:
   a first system enclosure, wherein the first primary data storage device and the controller are located within the first system enclosure.

9. The storage system of claim 1, further comprising:
   a first system enclosure, wherein the controller is located within the first system enclosure; and
   a second system enclosure, wherein the first primary data storage device is located within the second system enclosure.

10. The storage system of claim 1, further comprising:
    at least a first secondary data storage device, wherein the first secondary data storage device comprises a solid state storage device.

11. The storage system of claim 8, further comprising:
    at least a first secondary data storage device, wherein the first secondary data storage device comprises a solid state storage device, and wherein the first secondary data storage device is located within the first system enclosure.

12. A method for detecting shock in a data storage system, comprising:
    providing a data storage system controller, wherein the data storage system controller includes a processor running a shock detection algorithm and a shock sensor;

providing a first data storage device, wherein the first data storage device is sensitive to at least a shock event of a first type;

in response to a shock event, the shock sensor generating an output signal;

providing the output signal to the shock detection algorithm; and in response to the shock detection algorithm determining that the shock event is a shock event of a first type, initiating an alternate data storage process.

13. The method of claim 12, wherein the alternate data storage process includes instructing a host to delay sending data to the data storage system.

14. The method of claim 12, wherein the first data storage device is a first primary data storage device, the method further comprising:

providing a first secondary data storage device, wherein the alternate data storage process includes diverting data initially directed to the first data storage device to the first secondary data storage device.

15. The method of claim 14, wherein the first secondary data storage device includes a solid state storage device.

16. The method of claim 12, wherein the data storage system includes a plurality of data storage devices, wherein the first data storage device is one of the plurality of data storage devices, wherein the data storage system controller is a redundant array of independent disks controller, and wherein the plurality of data storage devices are hard disk drives.

17. The method of claim 16, wherein the controller is in a first enclosure, and wherein the plurality of data storage devices are in a second enclosure.

18. A data storage method, comprising:

providing a plurality of storage devices;

providing a data storage controller having a shock sensor and a shock detection algorithm, wherein the data storage controller controls a flow of data to and from the plurality of storage devices;

in response to the shock sensor of the data storage controller detecting a shock event, generating a signal that is provided to the shock detection algorithm; and in response to the shock detection signal, the shock detection algorithm characterizing the shock event and in response to the shock event exceeding a threshold parameter, the shock detection algorithm causing an alternate data storage scheme to be implemented by the data storage controller.

19. The data storage method of claim 18, further comprising:

providing a solid state storage device, wherein the alternate data storage scheme includes diverting data for the plurality of storage devices to the solid state storage device.

20. The data storage method of claim 19, wherein the plurality of storage devices and the data storage controller are contained within a first enclosure.

* * * * *